United States Patent [19]

Kubis et al.

[11] Patent Number: 5,109,653
[45] Date of Patent: May 5, 1992

[54] SEALING HEAD INCLUDING AN INDUCTION HEATING COIL

[75] Inventors: Charles S. Kubis, Palos Heights; John Walter, Evergreen Park, both of Ill.; Donald J. Roth, Westport, Conn.; Glenn R. Mohr, Linthicum, Md.

[73] Assignee: Continental Holdings Inc., Omaha, Nebr.

[21] Appl. No.: 207,654

[22] Filed: Jun. 16, 1988

[51] Int. Cl.$^5$ ............................................. B29C 65/46
[52] U.S. Cl. ..................................... 53/510; 53/131.3; 53/373.7; 53/DIG. 2; 156/380.2; 156/380.6; 156/583.1
[58] Field of Search ............... 156/69, 273.7, 274.2, 156/274.4, 379.6, 379.7, 380.2, 380.6, 583.1; 219/10.43, 10.53, 10.67, 10.73, 10.79; 53/88, 97, 109, 131, 360, 373, 510, 511, DIG. 2, 357, 358, 359, 361, 362, 363; 101/9, 16, 27, 31

[56] References Cited

U.S. PATENT DOCUMENTS

| | | | |
|---|---|---|---|
| 1,992,557 | 2/1935 | Tone et al. | 53/109 |
| 2,510,125 | 6/1950 | Meakin | 439/191 |
| 2,591,935 | 4/1952 | Heigl | 53/131 |
| 2,638,964 | 5/1953 | Andina | 156/580 |
| 3,152,429 | 10/1964 | Stanley et al. | 53/510 |
| 3,248,851 | 5/1966 | Ford | 53/373 |
| 3,604,880 | 9/1971 | O'Neill | 156/ |
| 3,632,943 | 1/1972 | Engler et al. | 219/10.53 |
| 3,684,619 | 8/1972 | Engler et al. | 219/10.79 |
| 3,748,422 | 7/1973 | Schäfer | 219/10.53 |
| 3,769,132 | 10/1973 | Cram | 156/308.2 |
| 3,808,074 | 4/1974 | Smith et al. | 219/10.43 |
| 3,950,922 | 4/1976 | Eberhardt | 53/356 |
| 4,003,186 | 1/1977 | Van Rede | 53/88 |
| 4,248,653 | 2/1981 | Gerber | 219/10.79 |
| 4,362,002 | 12/1982 | Rowland et al. | 53/357 |
| 4,430,142 | 2/1984 | Ochi et al. | 156/380.6 |
| 4,437,292 | 3/1984 | Buri et al. | 53/357 |
| 4,519,859 | 5/1985 | Roth et al. | 156/69 |
| 4,599,123 | 7/1986 | Christensson | 53/361 |
| 4,612,081 | 9/1986 | Kasper et al. | 156/583.1 |
| 4,640,733 | 2/1987 | Bogren | 53/361 |
| 4,707,213 | 11/1987 | Mohr et al. | 156/380.2 |
| 4,806,195 | 2/1989 | Namysl | 156/382 |
| 4,909,022 | 3/1990 | Kubis et al. | 53/DIG. 2 |

FOREIGN PATENT DOCUMENTS

0909738 9/1972 Canada ............................ 156/583.1

Primary Examiner—Michael W. Ball
Assistant Examiner—Steven D. Maki
Attorney, Agent, or Firm—Lockwood, Alex, FitzGibbon & Cummings

[57] ABSTRACT

This relates to a sealing head for sealing lids to cartons. The sealing head is provided with suction heads or cups for receiving a lid from a lid supply and depositing such lid in position on a carton which is mounted in a nest. The sealing head is provided with a seal member which forms the seal with a nest carrying a carton so that a vacuum may be drawn within the nest both within and around the carton. Thereafter, the sealing head provides an inert gas, such as nitrogen, to fill the carton with the inert gas, after which a support further sealing head moves the sealing head down further so that a lower edge of a projecting induction heating coil will clamp a lid against a carton and effect a heat bonding of the lid to the carton. The sealing head is self contained and has a fitting including a plurality of electrical prongs and fluid line sockets for coupling the sealing head to a receptacle. Finally, the induction heating coil of the sealing head is of a special configuration so as to compensate for a pull tab carried by the lid, which lid is generally oval to match the oval carton. The outline of the coil deviates slightly from the oval shape so as to provide a seal which has a starting point to initiate peeling of the lid from the carton. Further, this starting point is aligned with the pull tab and there are current compensating pins carried by the coil to compensate for the metal within the pull tab.

19 Claims, 3 Drawing Sheets

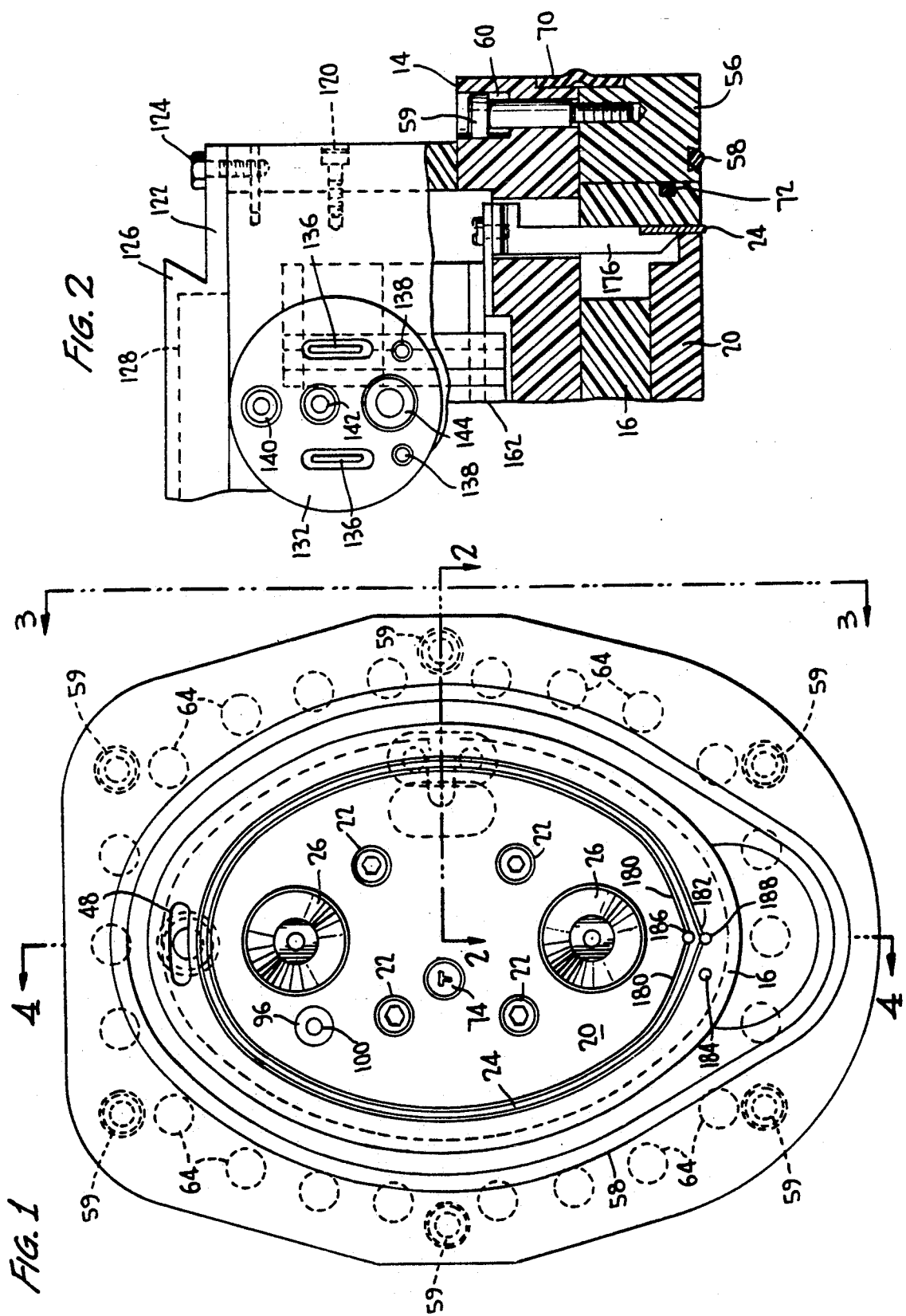

SEALING HEAD INCLUDING AN INDUCTION HEATING COIL

This invention relates in general to new and useful improvements in sealing heads, and more particularly to a sealing head for applying a heat bondable lid to a carton and heat bonded the same to such carton.

In accordance with this invention, there is provided a sealing head which is provided with at least one suction head for receiving a lid and positioning the lid with respect to a carton to be closed. The sealing head is provided with an induction heating coil for heating the lid by way of a metal foil layer in the lid and heat bonding the lid to a carton.

Most particularly, the sealing head is provided with a housing including a bottom wall from which the induction heating coil projects for clamping engagement of a peripheral portion of a lid with respect to a flange of a carton. At the same time there is telescoped over the bottom wall of the housing a seal member which is engageable with a nest for a carton which is to be closed to form a seal with the nest whereby a vacuum may be drawn within and around the carton after the lid is positioned with respect thereto to draw a vacuum within the carton prior to sealing.

The sealing head has a number of features. In addition to the coil and vacuum means, the sealing head may carry means for introducing nitrogen within the carton prior to the application of the lid to the carton.

Also, the sealing head will be provided with a vacuum level sensor to make certain that the required vacuum is being drawn within the carton before the lid is applied.

The sealing head may also be provided with a stamping device for identifying the particular head of a plural head machine which has applied the lid.

Yet another feature of the invention is the mounting within the housing of the sealing head a transformer for the induction heating coil.

A particular feature of the invention is the configuration and construction of the induction heating coil. The coil is particularly adapted for applying a lid having a projecting pull tab to an oval carton. In order to compensate for the metal within the projecting pull tab, that portion of the coil which is to be aligned with the pull tab is provided with current compensating means. Such current compensating means will include two pins, one of metal and one of ferrite, which are electrically bonded to the coil. The pins are disposed on opposite sides of the coil with the ferrite pin being disposed outermost.

With the above and other objects in view that will hereinafter appear, the nature of the invention will be more clearly understood by reference to the following detailed description, the appended claims and the several views illustrated in the accompanying drawings.

IN THE DRAWINGS

FIG. 1 is a bottom plan view of the sealing head and shows the general details thereof.

FIG. 2 is an enlarged fragmentary vertical sectional view taken generally along the line 2—2 of FIG. 1 and shows constructional details of the sealing head.

Figure 3:
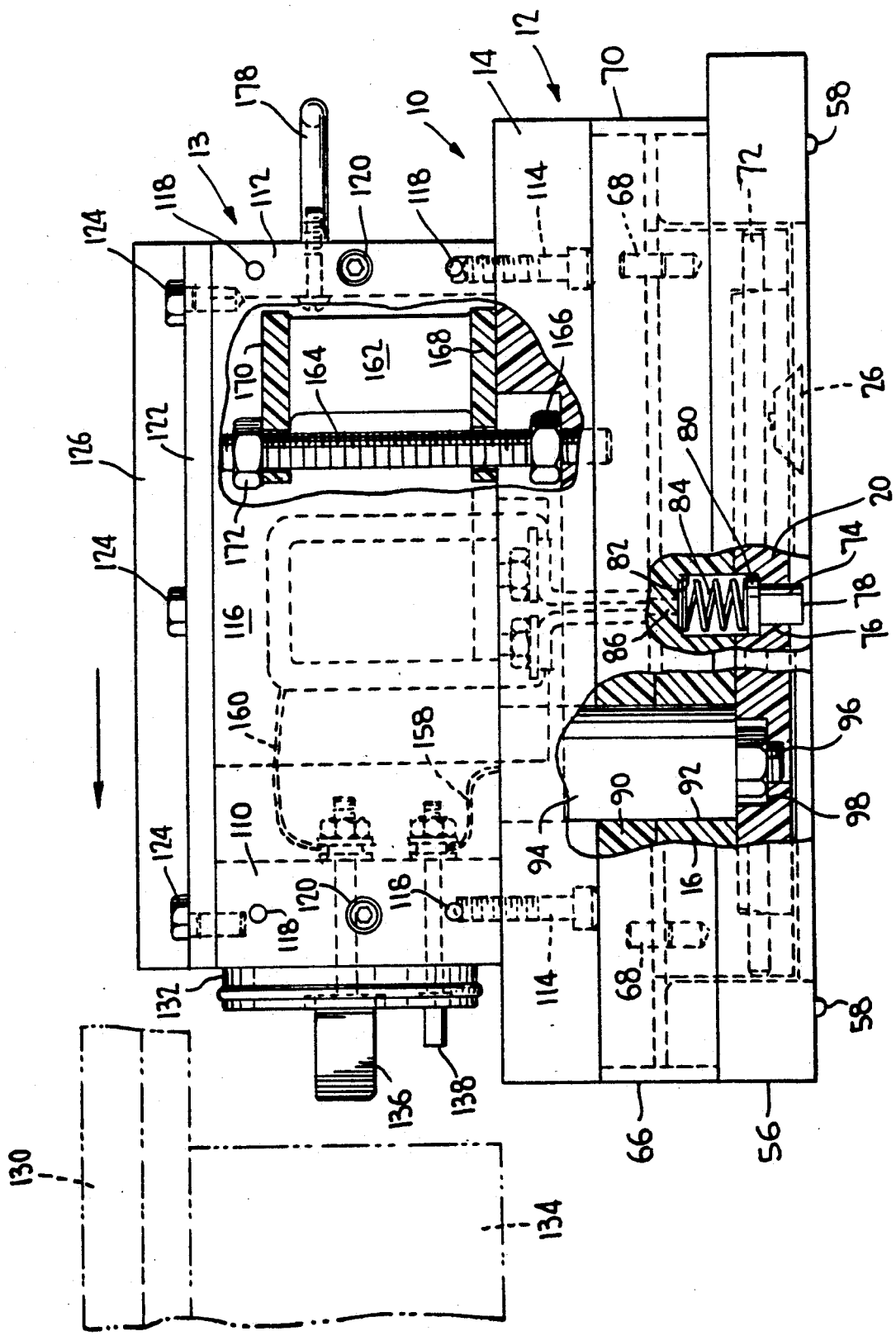
FIG. 3 is a side elevational view of the sealing head with parts broken away and shown in section, the view being taken generally along the line 3—3 of FIG. 1.

Referring now to the drawings in detail, it will be seen that there is illustrated the sealing head which is the subject of this invention, the sealing head being generally identified by the numeral 10. At this time it is pointed out that the sealing head 10 is particularly adapted to be part of an automatic multiple station machine wherein there is one of the sealing heads 10 at each of the stations. The sealing head 10 is intended to pick up a lid for a carton, form a seal with a nest carrying a filled carton, positioning such lid relative to the carton, effect first the drawing of a vacuum in and around the carton in conjunction with the nest, then direct an inert gas such as nitrogen into the carton, followed by the clamping of the lid to the carton and the heat bonding of the lid to the carton. Since only the sealing head per se is the subject of this invention, other components having been disclosed in co-pending applications, the description of the invention will be so limited.

Referring first to FIG. 3, it will be seen that the sealing head 10 includes a housing which is generally identified by the numeral 12. The housing 12 has an upper housing extension 13. For the most part, the components of the housing and the housing extension will be formed of plastic material.

Figure 4:
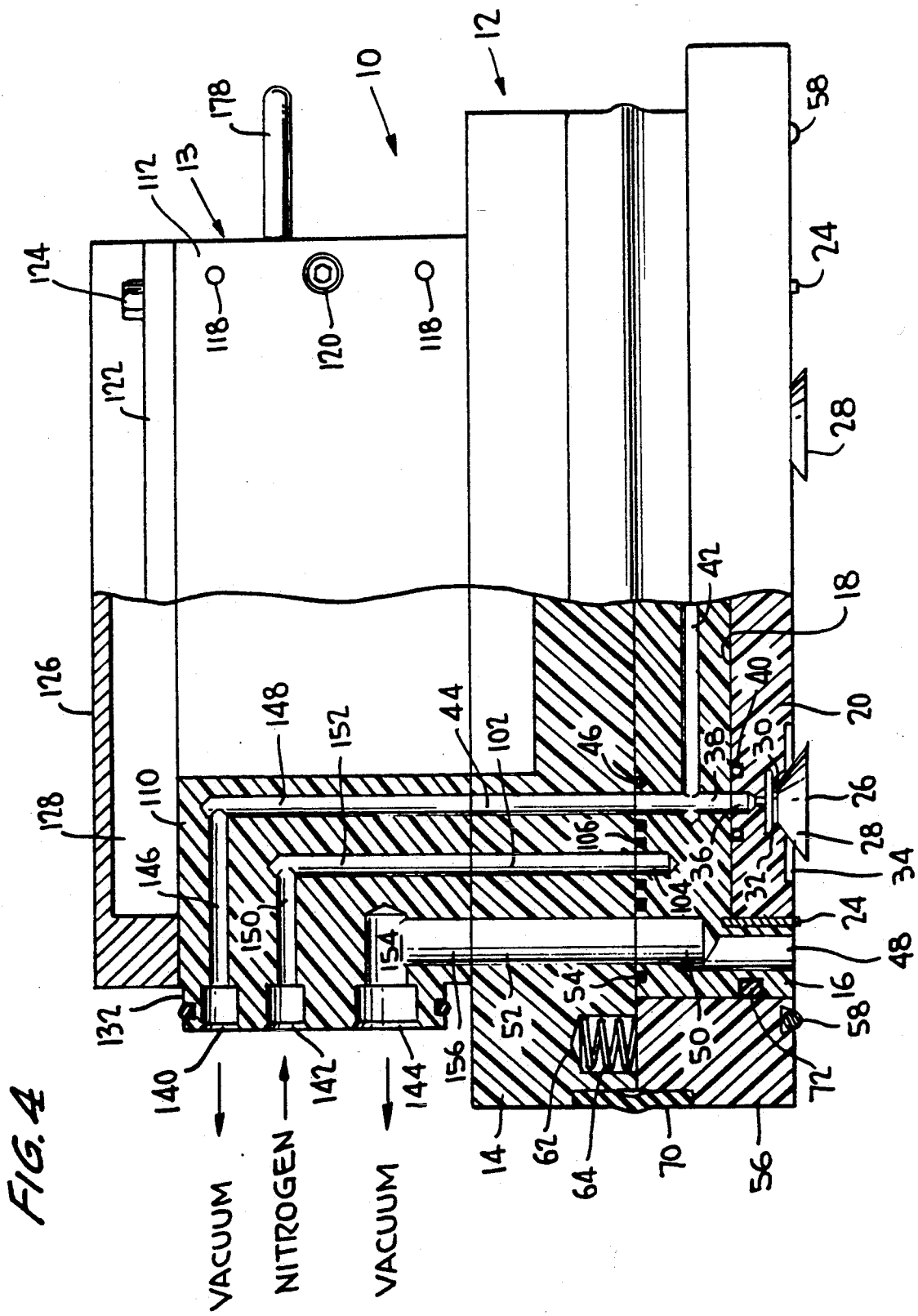
FIG. 4 is a vertical sectional view taken generally along the line 4—4 of FIG. 1 with parts only being shown in section and electrical contacts being omitted for purposes of clarity.

The housing 12, as is best shown in FIGS. 3 and 4, is formed of first of all of an upper plate 14 which has the outline generally shown in FIG. 1. The upper plate 14 has secured thereto an intermediate plate 16 which is of a lesser outline than the plate 14, as is shown in FIG. 1. The plate 16 has a notched underside, the notch being identified by the numeral 18, with a bottom plate 20 being seated in the notch 18. The plates 16 and 20 are secured to the plate 14 by suitable fasteners 22 which extend upwardly from the plate 20 as is best shown in FIG. 1.

As is best shown in FIG. 4, the plates 16 and 20 cooperate to fixedly mount an induction heating coil 24. The details of the induction heating coil 24 will be described hereinafter.

The bottom plate 20 carries two suction heads 26 which, as is best shown in FIG. 4, are primarily defined by suction cups 28. Each suction cup 28 is snapped into a stepped bore 30 formed in the underside of the plate 20. The upper end of the section cup 28, including a flange 32 thereof, is snapped into the bore 30. The underside of the plate 20, generally in alignment with the suction cups 28, is also provided with a relief opening 34 to receive the suction cup 28 when it is in its flattened state.

The stepped bore 30 includes an upper portion 36 which is in alignment with and in communication with a bore 38 extending through the bottom of the plate 16 into the notch 18. The plates 18, 20 are sealed around the bores 36, 38 by way of a sealing ring 40.

At this time, it is to be understood that there will be a bore 36, as well as a bore 38, for each of the suction heads 26. The bores 38 are joined together by a bore 42 in the plate 16. Further, at one end of the housing 12, the bore 38 extends through the plate 16 and is aligned with a bore 44. A seal 46 is formed between the plates 14, 16 surrounding the junction of the bores 38, 44.

At this time it is to be understood that in the operation of a carton closing machine of which the sealing head forms a part, the suction heads 26 will function to pickup a lid from a lid supply mechanism and to hold it on the underside of the sealing head 10 for positioning above and in alignment with a carton to be closed.

It is to be understood that a vacuum is to be drawn in and around a carton which is to be closed. Such a vacuum is drawn by way of an opening 48 formed in the underside of the plate 16 with the opening 48 being in communication with the lower end of a bore 50 in the plate 16. The bore 50 is in communication with and aligned with a bore 52 which extends through the plate 14. The plates 14, 16 are sealed relative to one another around the bores 50, 52 by an 0-ring 54.

In order that the vacuum drawn through the opening 48 will be effective, it is necessary that the sealing head 10 be sealed relative to a nest for the carton which is to be closed, the nest not being shown. Accordingly, there is carried by a lower portion of the housing 12 a seal member 56 which has mounted in the underside thereof a sealing ring 58. The sealing ring 58 is intended to compressively engage the upper surface of such a nest and form a seal therewith.

Referring now to FIG. 2 in particular, it will be seen that the seal member 56 is carried from the plate 14 in depending relation by way of a plurality of circumferentially spaced shoulder bolts 59, which have heads thereof seated in bores 60 in the upper surface of the plate 14. The bolts 59 axially position the seal member 56 relative to the plate 14. In order that the seal member 56 be normally in a lowered position, as is shown in FIG. 3, there is mounted in bores 62 in the underside of the plate 14 (FIG. 4) springs 64 which bear against the upper surface of the seal member 56. Thus, as is best shown in FIG. 3, the bottom of the seal member 56 is normally below the plane of the plate 20 and there is a space 66 between the plate 14 and the seal member 56. Further, as is shown in FIG. 3, there may be alignment pin and socket arrangements 68 between the plate 14 and the seal member 56 as is also shown in FIG. 3.

In addition, in order that the space 66 between the plate 14 and the seal member 56 may remain closed, there is provided a circumferential band 70 which extends around a reduced cross section portion of the plate 14 and the seal member 56, as is shown in FIGS. 2 and 4. The band 70 is preferably formed of a resilient readily bendable material so that when the seal member 56 moves upwardly relative to the plate 14 and closes the space 66, the band 70 may resiliently be formed outwardly as shown.

It is also pointed at this time with respect to FIGS. 2 and 4 that the fit between the seal member 56 and the outer periphery of the plate 16 is one wherein a seal must be effective. For this purpose, the plate 16 carries a sealing ring 72 which engages an opposed surface of the seal member 56 to form a gas tight seal between the plate 16 and the seal member 56 so that when a vacuum is drawn within the sealing ring 58, there can be no air drawn in between the plate 16 and the seal member 56.

In addition to the plate 20 serving to clamp the induction heating coil 24 in place, it will be seen that it also carries a stamp member 74 which is seated in a stepped bore 76 opening through the underside of the plate 20. The stamp member 74 has on the underside thereof suitable indicia producing means 78 for stamping an applied lid to identify the sealing head 10 which applied the lid. The stamp 74 is provided with an upper enlargement 80 which normally seats on a shoulder provided by the stepped bore 76. It is to be noted that the bore 76 opens into a bore 82 formed in the underside of the plate 16 and carries a compression spring 84 which permits the stamp 74 to move upwardly after it engages the lid. The upper end of the bore 82 is vented as at 86.

Referring once again to FIG. 3, it will be seen that the plates 14 and 16 have aligned bores 90, 92 which open through the plates and have seated therein a vacuum level sensor 94. The sensor 94 has a head 96 which is seated in a stepped bore 98 formed in and opening through the plate 20. The head 96 is provided with a small diameter inlet 100 as is best shown in FIG. 1.

At this time it is also be noted that plate 14 has a bore 102 which extends therethrough and opens into a bore 104 formed in the top of the plate 16. The plates 14 and 16 are sealed to each other around the bores 102, 104 by a seal 106. The bore 104 will open through the underside of the sealing head 10 for directing an inert gas, such as nitrogen, into an evacuated carton prior to the application of a lid to such carton.

With respect to the housing extension 13, it will be seen from FIG. 3 that at opposite ends of the housing 14 the housing extension 13 includes a block 110 and an end plate 112. These are secured to the plate 14 by means of suitable fasteners 114.

Also, it will be seen that the housing extension 13 includes a pair of side panels 116. The side panels 116 are positioned relative to the block 110 and the end plate 112 by way of aligning pins 118 and furthermore are secured in place by means of bolts 120. The hollow housing extension 13 is completed by a top panel 122 which is secured to the respective side panels by bolts 124. It is to be noted that the top panel 122 has a central portion 126 which is generally of a dovetailed cross section. Further, the top panel portion 126 is generally hollow as shown by the dotted line 128.

The dovetailed section 126 is receivable in a suitable support 130 in a releasable manner which in of itself is not part of this invention. Further, the block 110 includes a cylindrical fitting projection 132 which is to be associated with a receptacle 134 in a manner which is also not part of this invention, but the subject of a copending application.

The fitting 132, as is best shown in FIG. 2, carries two projecting electrical prongs 136 for supplying high frequency electrical energy to the induction heating coil 24. The fitting 132 also carries two electrically conductive prongs 138 for receiving low voltage current going to the vacuum level sensor 94. In addition, the fitting 132 is provided with suitable sockets for gasses, including a low volume vacuum socket 140, an inert gas socket 142 and a high volume vacuum socket 144. As is shown in FIG. 4, the block 110 has a bore 146 which forms a continuation of the socket 140 and which opens into a vertical bore 148 which is aligned with and in communication with the bore 44.

In a like manner, the socket 142 has as a continuation thereof a horizontal bore 150 which opens into a vertical bore 152 which is aligned with and in in communication with the bore 102. Finally, the socket 144 is aligned with a horizontal bore 154 formed in the block 110 with the bore 154 intersecting a bore 156 which is aligned with and is in communication with the bore 52.

At this time, it is pointed out that in FIG. 4 the prongs 136 and 138 are omitted for purposes of clarity although they are are properly shown in FIG. 3.

Referring once again to FIG. 3, it will be seen that the prongs 138 have electrical connections 158 with the vacuum level sensor 160. Also, it will be seen that the prongs 136 have electrical connections 160 with a transformer 162 which has a hollow center. A stud 164 is threaded into the plate 14 and is clamped there by a nut 166. The stud 164 passes through a plastic plate 168 which underlies the transformer 162 and further through another plastic plate 170 which overlies the transformer 162. The upper part of the stud 164 is provided with a nut 172 which serves to clamp the plate 170 down against the transformer and thus retain the transformer 162 in place.

The transformer 162 is, in turn, connected to the opposite ends of the induction heating coil 24 by means of connectors 176, as is best shown in FIG. 2.

Returning once again to FIG. 3, it will be seen that the end plate 112 is provided with a handle 178 for facilitating the removal and carrying of the sealing head 10.

Finally, reference is now made to the induction heating coil 24 as shown in FIG. 1. It is to be understood that the induction heating coil 24 is particularly shaped to bond a lid to a flange of an oval shaped carton. Further, it is to be understood that the lid will have a projecting pull tab for facilitating the peeling of the lid from the carton along that bond. Normally, it would be expected that the configuration of the coil 24 would be oval. However, it is of a slightly modified oval shape so as to provide a starting point for the peeling of the lid from a carton in alignment with the projecting pull tab of such lid. Thus at one end, the coil 24 is generally pointed, including two straight portions 180 which converge generally in a point 182. This arrangement provides for a similar shaped heat bond which includes a starting point at the point 182.

It is to be further understood that the lid which is to be heat bonding utilizing the induction heating coil 24 will preferably be of a laminated construction including an internal aluminum foil layer. If the lid were oval, this would pose no problem. However, as pointed out above, the lid will be provided with a pull tab to facilitate peeling of the lid from the carton. As a result, the metal foil is not uniform throughout the lid, but there is an added amount of metal foil in the pull tab. This has an influence on the electric field generated by the coil 24. In order to modify this field to negate the undesired effect of the aluminum foil in the pull tab, there are provided current compensating means generally identified by the numeral 184 and including a copper pin 186 and a ferrite pin 188. The pins 186, 188 are silver soldered, and thus electrically conductively bonded, to the coil 24.

Although only a preferred embodiment of the sealing head has been specifically illustrated and described herein, it is to be understood that minor variations may be made in the sealing head without departing from the spirit and scope of the invention as defined by the appended claims.

We claim:

1. A sealing head for heat sealing a heat bondable lid to a heat bondable carton, said sealing head comprising a base, having a bottom wall, an induction heating coil projecting downwardly from said bottom wall for engaging a lid in clamping relation, a seal member carried by said base surrounding said bottom wall forming means for direct sealing engagement with a nest for a carton to be closed by a lid, and a vacuum port opening through said bottom wall forming means for drawing a vacuum in a carton prior to the application of a lid.

2. A sealing head according to claim 1 wherein said seal member is mounted for resiliently resisted movement to a retracted position relative to said coil whereby sealing pressure may be applied by said coil on a lid.

3. A sealing head according to claim 2 wherein there are a plurality of compressable springs between said base and said seal member providing for said resiliently resisted movement.

4. A sealing head according to claim 2 wherein there is a seal between said base and said seal member for maintaining a seal between said base and said seal members as said seal member moves relative to said base.

5. A sealing head according to claim 2 wherein said seal member is normally axially spaced from an overlying portion of said base to provide a space, an outer peripheral resilient band sealing said space and overlapping adjacent portions of said base and said seal member, said band being outwardly deformable to permit said seal member to move axially relative to said base and decrease said axial spacing.

6. A sealing head according to claim 1 wherein said base bottom wall has opening therefrom a suction head for carrying a lid to be applied.

7. A sealing head according to claim 6 wherein said base includes a separate bottom plate carrying said suction head, said bottom plate being telescoped within said coil and forming part of coil mounting means.

8. A sealing head according to claim 7 wherein said base includes a further plate having a central lower recess carrying said bottom plate and cooperating with said bottom plate in the mounting of said coil.

9. A sealing head according to claim 8 wherein said bottom plate carries a sealing head identification stamp, said stamp extending through said bottom plate and being resiliently held by a spring bearing on said further plate.

10. A sealing head according to claim 1 wherein a vacuum level, sensor is mounted in said base and has an inlet port opening through said bottom wall.

11. A sealing head according to claim 1 wherein a transformer for said coil is clamped to a top surface of said base and is seated in a housing extension carried by said base.

12. A sealing head according to claim 1 wherein said base has an upper housing extension, mounting means carried by said housing extension, and a plug connector means carried by one end wall of said housing extension for forming releasable electrical and fluid connections.

13. A sealing head according to claim 12 wherein said mounting means forms a top wall of said housing extension.

14. A sealing head according to claim 1 wherein said coil is oval shaped to apply an oval lid having a metal layer to a carton with such lid having at one end a projecting pull tab, and said coil having in alignment with the intended portion of a pull tab current flow compensating means for compensation for the metal of such projecting pull tab.

15. A sealing head according to claim 14 wherein said current flow compensating means includes a metal pin and a ferrite pin.

16. A sealing head according to claim 14 wherein said current flow compensating means includes a metal pin and a ferrite pin with said pins being electrically conductively bonded to said coil.

17. A sealing head according to claim 14 wherein said current flow compensating means includes a metal pin and a ferrite pin with said pins being on opposite sides of said coil.

18. A sealing head according to claim 14 wherein said current flow complensating means includes a metal pin and a ferrite pin with said pins being on opposite sides of said coil, and said ferrite pin being exteriorly of said coil.

19. A sealing head according to claim 14 wherein said coil is generally of a pointed outline at said intended position of said pull tab to form a peelable seal starting point in a bond between a lid and a carton.

* * * * *